Dec. 3, 1940.  J. L. YOUNGHUSBAND  2,223,979
LIPSTICK DEVICE
Filed Feb. 17, 1939   2 Sheets-Sheet 1
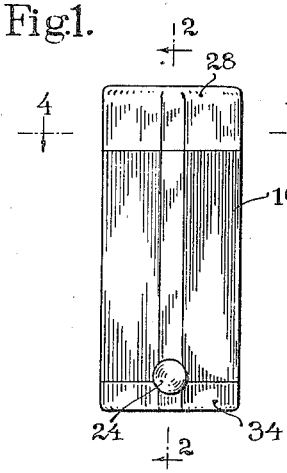
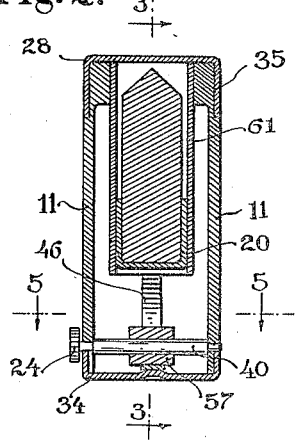
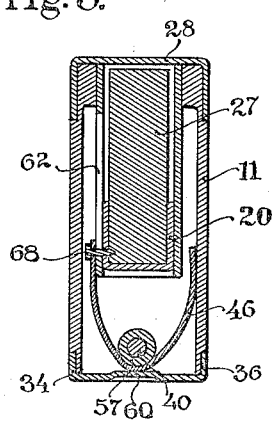
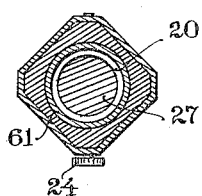
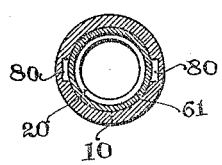
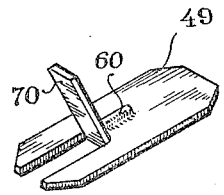
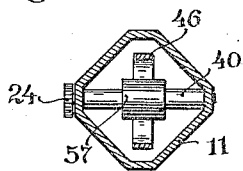
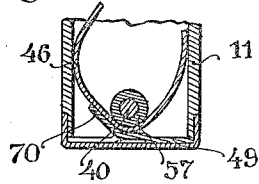
JAMES L. YOUNGHUSBAND
INVENTOR
BY *James R. McKnight*
ATTORNEYS Dec. 3, 1940.  J. L. YOUNGHUSBAND  2,223,979
LIPSTICK DEVICE
Filed Feb. 17, 1939  2 Sheets-Sheet 2

JAMES L. YOUNGHUSBAND
INVENTOR

BY *James R. McKnight*
ATTORNEYS

Patented Dec. 3, 1940

2,223,979

UNITED STATES PATENT OFFICE 2,223,979

LIPSTICK DEVICE

James L. Younghusband, Chicago, Ill.

Application February 17, 1939, Serial No. 256,958

2 Claims. (Cl. 206—56)

My invention relates to a case for holding lipstick having means for projecting the lipstick for use and retracting it within the case for storage during nonuse.

Among the objects of my invention is to provide simple, manually operable means for the quick projection and retraction of the lipstick, said means occupying small space not otherwise used in the case, and such other objects, advantages and capabilities as will later more fully appear and which are inherently possessed by my invention.

While I have shown in the accompanying drawings preferred embodiments of my invention, yet I wish it understood that the same are susceptible of modification and change without departing from the spirit of my invention.

Figure 9:
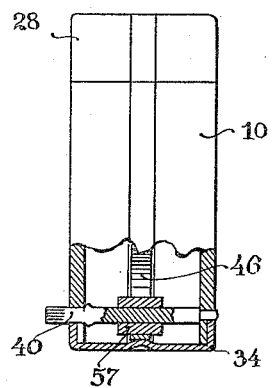
Figure 10:
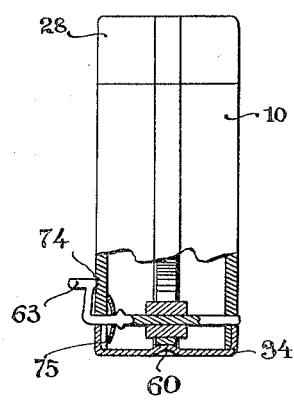
Figure 11:
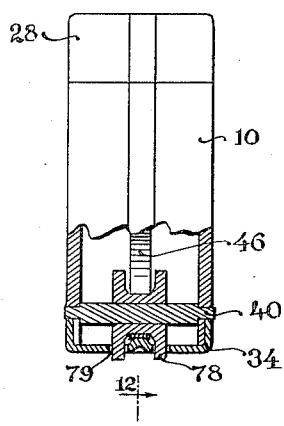
Figure 12:
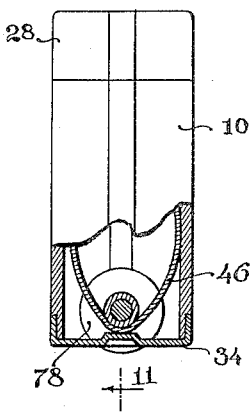

Referring to the drawings, Fig. 1 is a side elevation of my lipstick device; Fig. 2 is a view on line 2—2 of Fig. 1; Fig. 3 is a view on line 3—3 of Fig. 2; Fig. 4 a view on line 4—4 of Fig. 1; Fig. 5 a view on line 5—5 of Fig. 2; Fig. 6 is a cross sectional view of my lipstick device in cylindrical form; Fig. 7 is a detail sectional view illustrating lip 70 in operation; Fig. 8 is a detail perspective view of member 49; Fig. 9 is a partial sectional view showing the turnable member formed for operation by direct manual pressure from the exterior of the device; Fig. 10 is a partial sectional view illustrating one form of retaining means with the crank; Fig. 11 is a view on line 11—11 of Fig. 12; Fig. 12 is a view on line 12—12 of Fig. 11.

One embodiment selected to illustrate my invention comprises a hollow body member 10 having side walls 11 and open at the top and bottom. Positioned and movable within said body member 10 is a holding member or cup 20 adapted to hold lipstick 27 or the like. I prefer to employ a body member of angular contour and a cup of substantially round contour so as to provide vacant corners between the body member and the cup.

I may also use a sleeve 61 positioned within the body member, said sleeve having a slit 62.

Adjacent the lower portion of the body member 10 is a turnable member 40. The turnable member 40 is rotatably supported by oppositely disposed side walls 11, or the corners of the same when extending diagonally across the body member 10. Said turnable member 40 extends through the wall of the body member 10 on one end, and may be directly manually operable from the exterior of the device as shown in Fig. 9 or by a manually operable member such as a wheel 24, crank 63 or the like attached to one end of the turnable member 40 as shown in Figs. 3 and 10. Attached to the turnable member 40 at substantially its center is a drum 57 of rubber, composition or other substantially non slip material.

A resilient member 46 is attached adjacent its upper end by a pin 68 to the outer side of the cup 20 and extends downwardly within one of the vacant spaces of the body member 10 to the turnable member 40 where it is bent so that it engages the drum 57. The resilient member continues past the drum 57 and is bent to extend upwardly within one of the opposite vacant spaces of the body member 10.

When the member 24 is turned the turnable member 40 is also turned. When the member 24 is turned in one direction the turnable member 40 moves the drum 57 which in turn moves the resilient member 46 so that the resilient member moves the cup 20 to substantially the top of the body member 10 for use. When the member 24 is turned in the opposite direction the turnable member 40 turns and moves the drum 57 which moves the resilient member 46 to pull the cup with its lipstick 27 back into the body member 10 for storage during nonuse.

The pin 68 slides in the slit 62 as the resilient members 46 and cup 20 are moved. The sleeve 61 protects the resilient member 46 and turnable member 40 from any contact or clogging with lipstick 27 from cup 20.

A bottom closure 34 is preferably fitted by friction grip within a depression 36 in the lower outer ends of the side walls 11 of body member 10. Adhesive may be used to make the closure permanent. A cap 28 is formed to fit over the open top of body member 10 by friction grip within depression 35 at the upper ends of the side walls 11.

The bottom closure 34 has attached thereto a bearing 49 for the resilient member 46. Said closure 34 or bearing 49 may have a substantially centered portion 60 for directing the resilient member against the drum 57 to facilitate the operation of the device. Lip 70 on bearing 49 prevents buckling of the resilient member 46.

My turnable member 40 may have means associated therewith for temporarily restraining rotation. For example my wheel or as illustrated in Fig. 10 my crank 63 is adapted to engage a notch 74 in the outer side wall of the body member to cooperate with resilient cup washer 75 so that the cup 20 with its lipstick 27 may be held at any desired position.

When my body member 10 is angular in contour and the cup 20 substantially round, vacant corners or spaces are left between the body member and the cup so that the resilient member 46 may move therein without altering the shape of the cup or lipstick. My body member 10 may also be cylindrical in shape, and in such construction I provide for slots 80 as shown in Fig. 6 for the resilient member 46.

Another embodiment of my invention is to provide drum 57 with a flange 78 on one or both sides. The bottom closure 34 in this combination has one or more openings 79 for the passage therethrough of said flange or flanges 78. With this construction the user may operate the turnable member 40 by applying turning pressure to the flange or flanges 78. This construction eliminates the need of manually operable member 24.

Having thus described my invention, I claim:

1. In a lipstick device a hollow body member, a holding member adapted to hold lipstick movable within said body member, a resilient member positioned within said body member and attached at its upper end to said holding member, a turnable member rotatably attached to the walls of said body member adjacent its lower portion, a wheel attached to said turnable member and operable from the exterior of the device for turning said turnable member, and a contact member attached to said turnable member, said resilient member extending down to and engaging said contact member so as to be moved thereby.

2. A lipstick device comprising a body member having a hollow interior, a lipstick holder slidably positioned in said hollow interior, a turnable member rotatably attached to the walls of said body member adjacent its lower portion and operable from the exterior of the device, a drum of substantially non slip material attached to said turnable member, a resilient member having one end attached to said cup and extending downwardly and in frictional driving engagement with the lower side of said drum so as to be moved thereby, guide means comprising a supporting lip angularly disposed beneath said turnable member and spaced therefrom substantially the thickness of said resilient member, said supporting lip extending diagonally along the path of said resilient member on the delivery side of said drum, and closures for the open ends of the body member.

JAMES L. YOUNGHUSBAND.